US006429855B2

(12) United States Patent
Pabon et al.

(10) Patent No.: US 6,429,855 B2
(45) Date of Patent: Aug. 6, 2002

(54) COMPUTER-TELEPHONY INTEGRATION EMPLOYING AN INTELLIGENT KEYBOARD AND METHOD FOR SAME

(75) Inventors: Reinaldo Pabon, Whitehouse Station; Richard Mauro, Flemington, both of NJ (US)

(73) Assignee: G & R Associates Incorporated, Berkeley Heights, NY (US)

( * ) Notice: Subject to any disclaimer, the term of this patent is extended or adjusted under 35 U.S.C. 154(b) by 0 days.

(21) Appl. No.: 09/859,110

(22) Filed: May 16, 2001

Related U.S. Application Data

(63) Continuation of application No. 09/052,650, filed on Mar. 31, 1998, now Pat. No. 6,256,020.
(60) Provisional application No. 60/041,767, filed on Mar. 31, 1997.

(51) Int. Cl.[7] .................................................. G09G 5/00
(52) U.S. Cl. ......................................... 345/172; 379/96
(58) Field of Search ................................ 345/172, 168; 179/2 DP; 379/63, 88, 93, 96, 210

(56) References Cited

U.S. PATENT DOCUMENTS

| | | |
|---|---|---|
| 4,490,604 A | 12/1984 | Read et al. |
| 4,524,244 A | 6/1985 | Faggin et al. |
| 4,551,717 A | 11/1985 | Dreher |
| 4,633,227 A | 12/1986 | Menn |
| 4,823,311 A | 4/1989 | Hunter et al. |
| 4,853,888 A | 8/1989 | Lata et al. |
| 4,853,952 A | 8/1989 | Jachmann et al. |
| 4,964,075 A | 10/1990 | Shaver et al. |
| 4,975,896 A | 12/1990 | D'Agosto, III et al. |
| 5,123,098 A | 6/1992 | Gunning et al. |
| 5,181,029 A | 1/1993 | Kim |
| 5,265,252 A | 11/1993 | Rawson, III et al. |
| 5,285,400 A | 2/1994 | Stent et al. |
| 5,355,327 A | 10/1994 | Stent et al. |
| 5,381,517 A | 1/1995 | Thorndike et al. |
| 5,396,591 A | 3/1995 | Goss |
| 5,398,045 A | 3/1995 | Sach et al. |
| 5,483,251 A | 1/1996 | Dagdeviren |
| 5,486,846 A | 1/1996 | Comer et al. |
| 5,557,798 A | 9/1996 | Skeen et al. |
| 5,572,239 A | 11/1996 | Jaeger |
| 5,572,570 A | 11/1996 | Kuenzig |
| 5,600,313 A | 2/1997 | Freedman |
| 5,742,808 A | 4/1998 | Hasuo |
| 5,790,652 A | 8/1998 | Gulley et al. |
| 5,917,905 A | 6/1999 | Whipple et al. |

FOREIGN PATENT DOCUMENTS

| | | |
|---|---|---|
| EP | 0226392 | 6/1987 |
| WO | WO 95/12841 | 5/1995 |
| WO | WO 95/12877 | 5/1995 |

OTHER PUBLICATIONS

Catchpole, et al., "Introduction to Computer Telephony Integration", *British Telecommunications Engineering*, vol. 14, Jul. 1995, pp. 98–105.

*Primary Examiner*—Amare Mengistu
(74) *Attorney, Agent, or Firm*—Hoffman & Baron, LLP

(57) ABSTRACT

An improved computer-telephony integrated user console includes a computer system electrically connected to a telephone system. The computer-telephony integrated user console further includes an intelligent integrated keyboard which includes at least one programmable display key. The intelligent integrated keyboard is electrically connected to the computer system. Each display key includes an electrical switch and a programmable electrical display element, such as a bit-mapped LCD array. The display is responsive to commands received from the computer system and displays text and/or graphics on the key to indicate a current function assigned to that key. The function of the key is dynamic, and is controlled by a software automation server operating in the computer.

15 Claims, 10 Drawing Sheets

Microfiche Appendix Included
(1 Microfiche, 46 Pages)

COMPUTER-TELEPHONY INTEGRATION EMPLOYING AN INTELLIGENT KEYBOARD AND METHOD FOR SAME

CROSS-REFERENCE TO RELATED APPLICATIONS

This application is a continuation of U.S. application Ser. No. 09/052,650 now U.S. Pat. No. 6,256,020, filed on Mar. 31, 1998 which claims the benefit of U.S. Provisional Application No. 60/041,767, filed on Mar. 31, 1997 entitled "Computer-Telephony Integration Employing an Intelligent Keyboard and Method for Same," which are incorporated herein by reference.

A microfiche appendix having a total of 46 frames on one sheet is included in this application. The appendix contains material which is subject to copyright protection. The copyright owner has no objection to the facsimile reproduction by any one of the microfiche appendix as it appears in the Patent ant Trademark Office patent files or records, but otherwise reserves all copyrights whatsoever.

BACKGROUND OF THE INVENTION

1. Field of the Invention

The present invention relates generally to telephone systems, and more particularly relates to a computer-telephony integration employing an intelligent keyboard to facilitate improved user interface.

2. Description of the Prior Art

Modern business practice relies heavily on the use of both telephone systems and computer systems as important tools. Quite often, the simultaneous use of these powerful tools is required. Typical examples of such applications include customer service centers, telephone based sales, telephone surveys and the like.

Therefore, it is often desirable to provide a degree of interaction between the telephone system and the computer system to improve efficiency. In this case, the telephone system is capable of responding to commands received by the computer, such as dialing a telephone number from a database stored in a computer. Similarly, the computer is able to respond to commands received from the telephone system, such as providing a visual indication that a call is incoming.

Business telephony systems have become quite complex and provide a number of features in addition to local switching and control of incoming calls. These systems, often referred to as private branch exchanges (PBX), are capable of multiplexing a large number of voice and data signals from a large number of user consoles. Often, the PBX includes a caller identification (ID) function to indicate the phone number of an incoming call on the user console.

Further, many PBX also include automated touch-tone answering systems. These systems prompt the caller through a series of questions, then route the call according to answers which are entered by the caller on a touch-tone telephone. The answers, in digital form, can also be forwarded along with the incoming telephone call. This provides the user at the console with certain information about the caller, such as account number and the nature of the call, even before the call is answered. A sophisticated user console interfaced to the PBX can display such information on a computer terminal associated with the user console.

One such user console, known in the prior art, includes a telephone handset combined with a digital terminal employing a touch-sensitive cathode ray tube (CRT). The digital terminal is part of a data processing system which stores business related information, such as a database of customers. In addition, information regarding the incoming call may also be displayed on the CRT. During the course of a call, information may be entered into the data processing system by the user at the console by use of a keyboard associated with the digital terminal. Further, the touch sensitive CRT associated with the terminal allows a variety of commands to be selected by the user by touching the screen where these commands are displayed.

The use of the touch screen allows the user to enter commands with fewer key strokes on the keyboard. However, the use of a touch sensitive CRT has the disadvantage of requiring the user to remove his or her hands from the keyboard to use the touch screen. As a result, the data entry process is interrupted, resulting in inefficiencies in the call answering process. In addition, while selections are being made on the touch screen, the field of view of the screen is obscured to the user by his or her own hand. A final disadvantage associated with the use of the touch screen is that the commands which are available to the user are limited to those currently being displayed on the CRT by an active software application.

As an alternative to the use of a touch sensitive CRT, other computer-based PBX user consoles in the prior art rely on a digital pointer, such as a mouse, to control the operation of both a telephone system and a data processing system. As with the case of the touch sensitive CRT, commands related to the telephone system and data processing system are displayed on the CRT of a digital computer terminal. To select one of the commands, the digital pointer is moved until an indicator which is displayed on the CRT is proximate to the desired command. Typically, a switch on the digital pointer is then depressed to select the desired command.

While the use of the digital pointer alleviates the problem of obscuring the field of view during command selection, this system still requires the user' s hands to leave the main keyboard to manipulate the digital pointer. As with the touch screen, the digital pointer can only access those commands currently being displayed by the active application on the CRT. Also, digital pointers often require additional space on a desktop on which to move the digital pointer. A further disadvantage of digital pointers is that a degree of dexterity is required to manipulate the pointer. While seemingly trivial, in the process of responding to hundreds of calls a day, this process can fatigue the user and possibly result in a repetitive motion injury.

OBJECTS AND SUMMARY OF THE INVENTION

It is an object of the present invention to provide a computer-telephony integrated system which includes an improved user console.

It is another object of the present invention to provide a computer-telephony integrated system which includes a user console which provides for more efficient manipulation of information in a data processing system and control of a telephony system.

It is yet another object of the present invention to provide a computer-telephony integrated system which includes a user console that allows a user to easily manipulate information in a data processing system as well as control a telephone system without the use of a touch sensitive screen or a digital pointer, such as a mouse.

It is a further object of the present invention to provide an intelligent keyboard suitable for use with a computer-telephony integrated user console.

It is still a further object of the present invention to provide a method of operating a computer-telephony integrated user console employing an intelligent keyboard.

In accordance with one form of the present invention, an improved computer-telephony integrated user console is formed employing a personal computer, a telephone line interface, and an integrated intelligent keyboard system. The integrated intelligent keyboard system preferably includes a standard alphanumeric keyboard and a plurality of intelligent function keys. The intelligent function keys include a switch and an integral display associated with each switch. The display associated with the intelligent function keys, as well as the function of each of the intelligent function keys, is dynamic. The function and display are responsive and adaptive to events detected by the computer from the telephone system and/or applications software.

The improved computer-telephony integrated user console of the present invention is controlled by software. The control software is resident in the personal computer and controls the interface between the telephone system, general purpose applications software and the integrated intelligent keyboard. The control software enables the integrated intelligent keyboard to respond and adapt to events detected by other software applications and to events detected within the telephone system.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
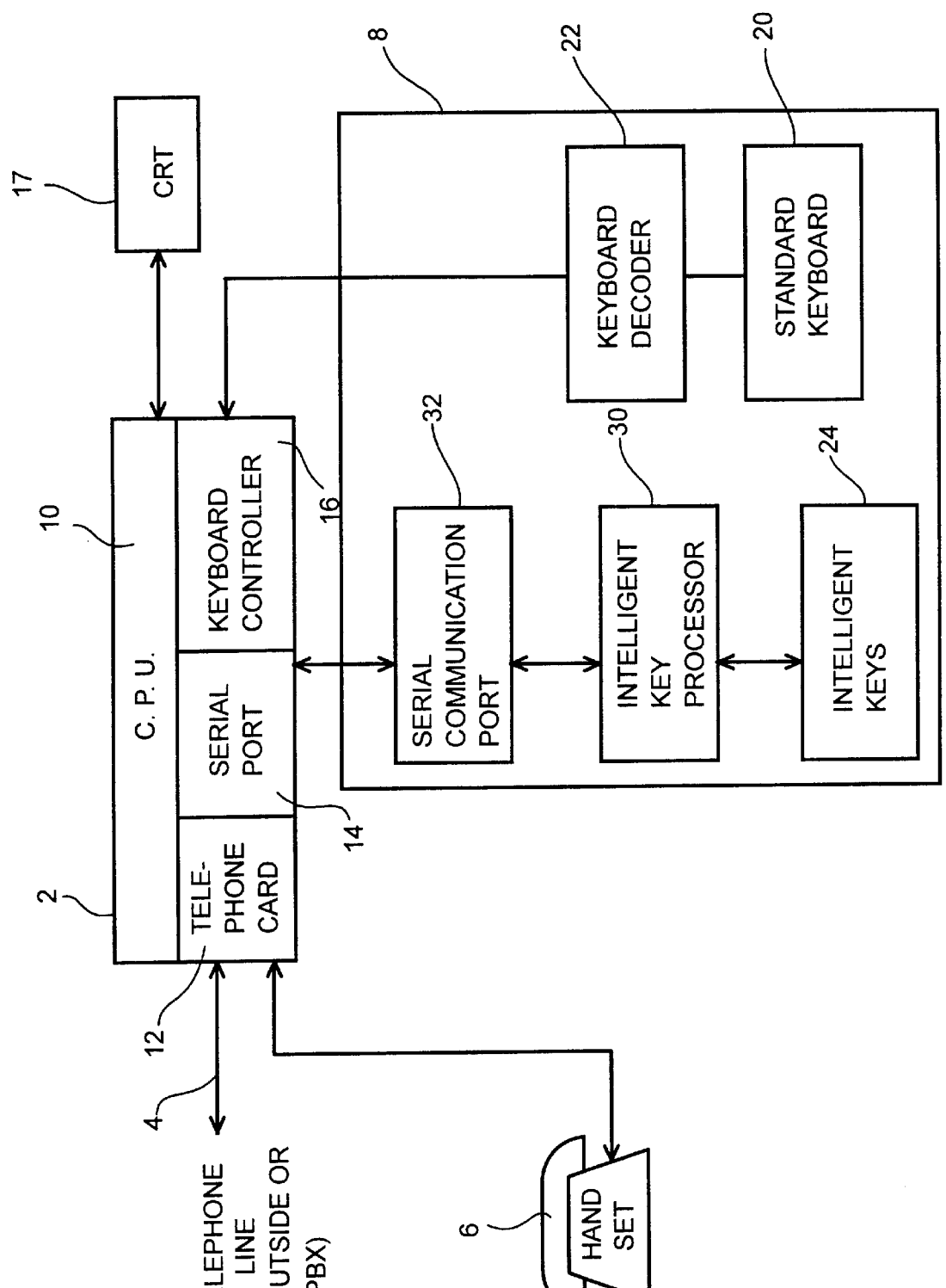
FIG. 1 is a block diagram of a computer-telephony integrated user console formed in accordance with the present invention.

FIG. 1 is a simplified electrical block diagram of a computer-telephony integrated (CTI) user console formed in accordance with the present invention. The CTI user console includes a computer 2 which interfaces to a telephone line 4. The computer 2 further interfaces to a conventional audible telephone headset or handset 6. An important aspect of the present invention is that the CTI user console further includes an intelligent integrated keyboard 8.

Preferably, the computer 2 will take the form of an open architecture personal computer, conforming to International Standards Association (ISA) standards, such as that manufactured by IBM and other compatible manufacturers. The computer 2 further includes a central processing unit (CPU) 10 which coordinates the activities of the computer 2. Preferably, the CPU 10 is interfaced to a standard bus architecture such as an ISA bus. Preferably, also interfaced to the bus are at least one telephone line card 12, at least one serial port 14 and a standard keyboard controller 16. The computer 2 further includes a conventional cathode ray tube (CRT) 17 or other suitable computer display.

The telephone line card 12 provides an interface between the telephone line 4, the CPU 10 and the handset 6. The telephone line card 12 receives signals from the telephone line 4 such as ring detect, dial tone, caller identification (ID) information and other information related to the telephone system. In addition, the telephone line card 12 connects the telephone handset 6 to the telephone line 4 to allow a user to place and receive calls. In this configuration, the computer 2, telephone line card 12 and handset 6 interact to operate as a conventional telephone. A suitable telephone line card 12 is the BRI adapter-ISA, manufactured by Teloquent, Inc. of Billerica, Massachusetts.

Figure 2:
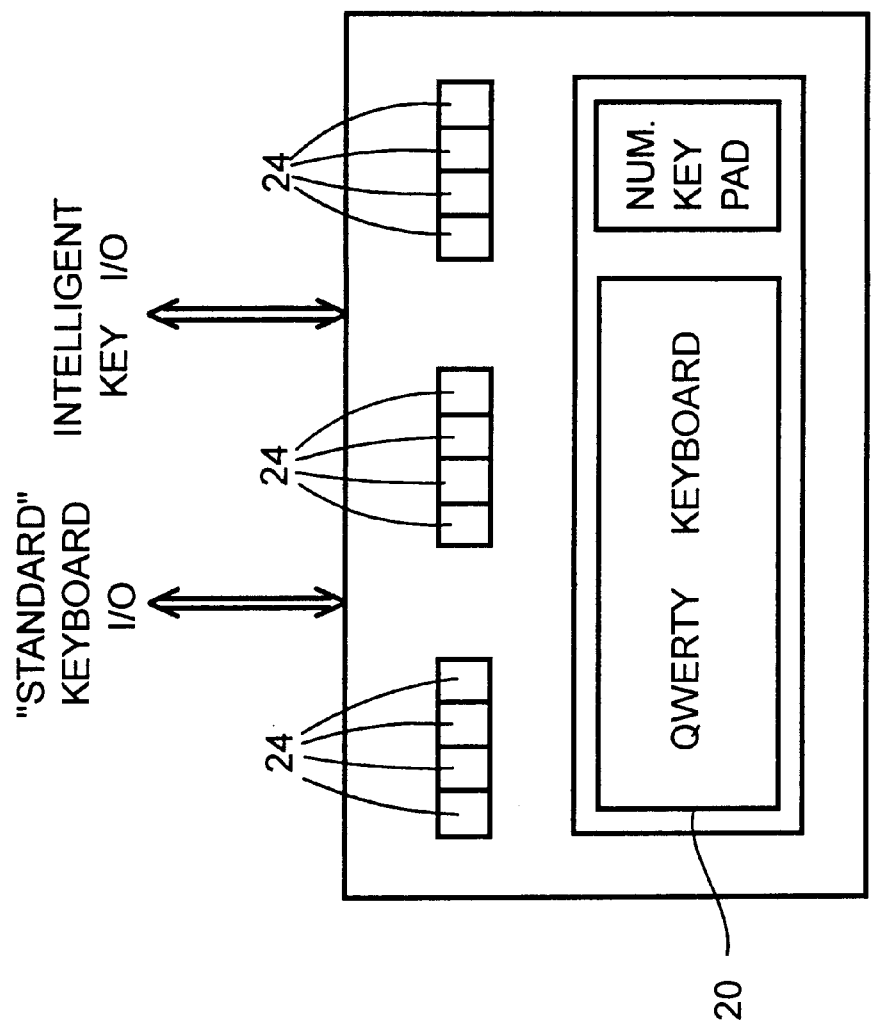
FIG. 2 is a pictorial diagram of an exemplary embodiment of an integrated intelligent keyboard formed in accordance with the present invention.
Figure 3:
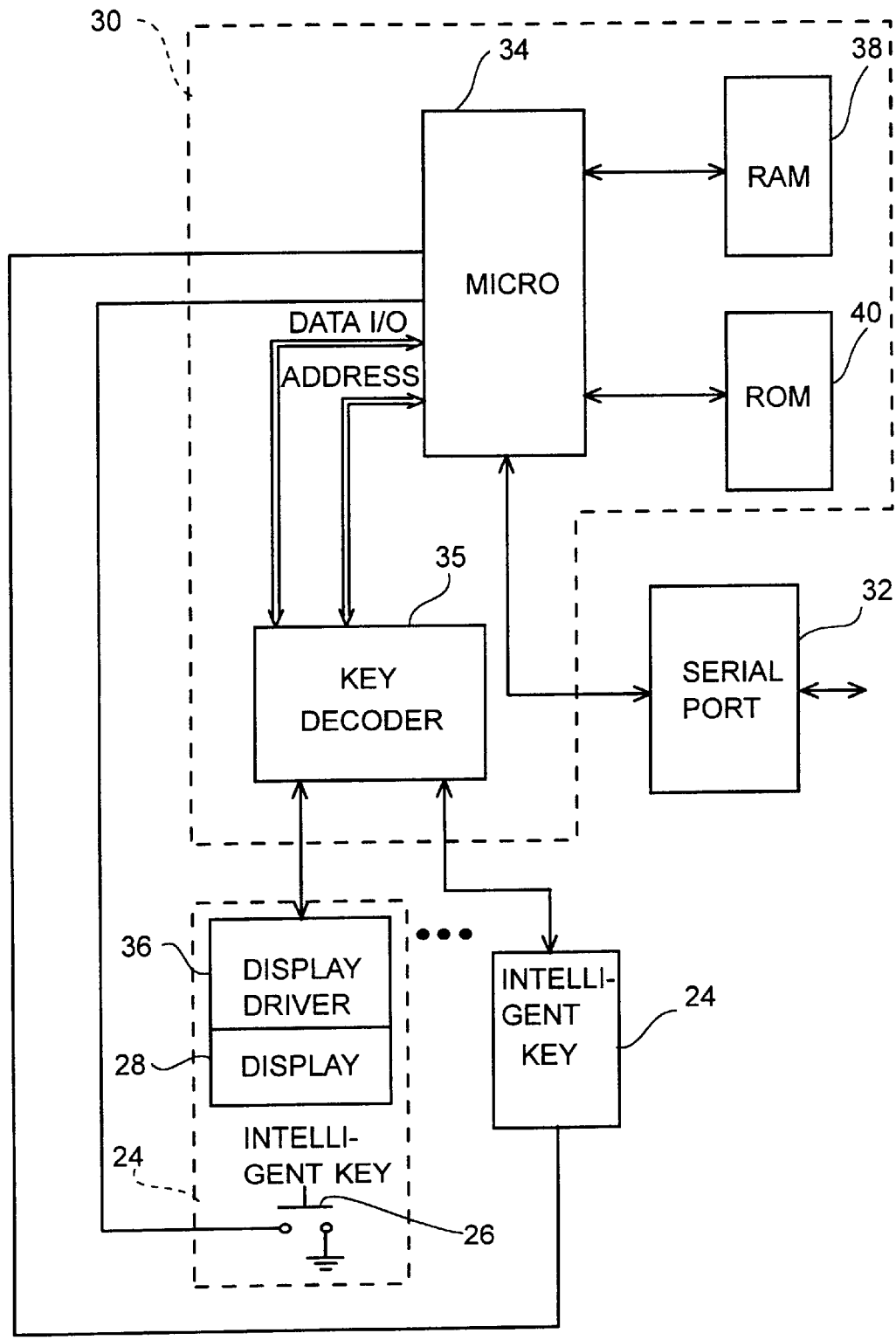
FIG. 3 is an electrical block diagram of circuitry associated with an intelligent keyboard formed in accordance with the present invention.

The intelligent integrated keyboard 8, illustrated in FIGS. 1–3, provides an enhanced user interface for the computer-telephony integration. The intelligent integrated keyboard 8 preferably includes a standard keyboard 20, such as a 101 key QWERTY keyboard commonly used with the IBM personal computer (PC) architecture. The standard keyboard 20 is interfaced to the keyboard controller 16 by a conventional keyboard decoder 22, as is well known in the art.

The intelligent integrated keyboard 8 further includes a plurality of intelligent keys 24. FIG. 2 illustrates a preferred embodiment of the intelligent integrated keyboard 8. In this embodiment, twelve intelligent keys 24 are used. The intelligent keys 24 are physically arranged as three key groups with four keys per key group. It will be appreciated that while the keyboard is illustrated and described in the preferred, integrated form, the standard keyboard 20, 22 may be formed as a separate assembly from the intelligent keyboard 24, 30, 32.

The intelligent keys 24 are under the control of a dedicated intelligent key processor 30. The intelligent key processor 30 interfaces to the computer 2 via a serial communication port 32 associated with the intelligent integrated keyboard 8. Preferably, the serial communication port 32 interfaces with a serial port 14 associated with the computer 2.

Referring to the electrical block diagram of FIG. 3, each intelligent key 24 further includes a switch mechanism 26 and integral display means 28. A suitable integrated switch/display is model number LC24 manufactured by HE Electronics of Neunkirchen, Germany. The switch 26 is electrically coupled to a microprocessor 34 which is part of the intelligent key processor 30. While not illustrated, switch buffering and debouncing circuits, which are well known in the art of digital circuit design, can be interposed between each switch 26 and the microprocessor 34. Alternatively, software switch debouncing may be employed to improve closure detection.

The display means 28 of the intelligent keys 24 are connected to a display driver 36 which is electrically connected to the microprocessor 34 through a key decoder 35. In the LC24 switch/display, manufactured by HE Electronics, the display driver 36 is integral to the intelligent key 24. This display driver 36 includes a serial data interface to communicate with the microprocessor 34. The key decoder 35 includes an input/output (I/O) port electrically coupled to the microprocessor 34 and an address input port electrically coupled to the microprocessor 34. The key decoder 35 also includes a plurality of I/O ports which are connected to the display driver 36 of each intelligent key 24. The microprocessor 34 selects one of the intelligent keys by applying an appropriate digital signal to the address port of the key decoder 35. The key decoder 35 responds by electrically connecting the microprocessor to the selected intelligent key display driver 36.

Preferably, the display means 28 is a bit mapped, liquid crystal display (LCD). The LCD is a matrix of points, or pixels, which darken in response to a display driver signal for each pixel. To display graphics and text on the LCD, these symbols must first be converted to digital pixel-based bit maps. The pixel-based bit maps are received by the microprocessor 34 and are converted to appropriate digital signals for the display driver 36. The display driver 36 is responsive to the received digital signals and provides suitable driving signals to the LCD 28.

The intelligent key processor 30 further includes conventional memory elements of random access memory (RAM) 38 and read only memory (ROM) 40. The RAM 38 and ROM 40 are electrically coupled to the microprocessor 34 in a manner which is conventional in the art of computer design. The RAM 38 is employed by the microprocessor 34 for temporary, volatile data storage and retrieval during operation. The ROM 40 is programmed with permanent storage such as the operating program for the microprocessor 34 and permanent data required by the keyboard 8. To reduce size and cost, the RAM 38 and ROM 40 can be integrated in a single integrated circuit with the microprocessor 34. A suitable device which includes the functions of the microprocessor 34, RAM 38 and ROM 40 may be selected from the 8051 family of microcontrollers commonly manufactured by several companies, including Intel and Signetics.

Through the serial port 32, the intelligent key processor 30 receives commands from the computer 2. These commands are generated in response to events detected on the telephone line 4 and applications software running in the computer 2. In response to these commands, the microprocessor 34 provides signals to the display driver 36 which effect a change in the display on the LCD 28. Preferably, the text and graphics displayed correspond to a function which is currently assigned to the switch 26 of each intelligent key. The microprocessor 34 is also responsive to closures in each switch 26 and provides signals through the serial port 32 to the computer 2 when such closures are detected. In this way, bidirectional communication between the integrated intelligent keyboard 8 and computer 2 is established.

One important aspect of the present invention is the software which runs on the computer 2 to control the CTI user console of the present invention. Furthermore, the keyboard, software and communications drivers of the present invention, in combination, preferably form a self-contained object component which can be embedded in other object-oriented software applications or used with object-oriented programming languages (e.g., Visual Basic® and Visual C++®, which are registered trademarks of Microsoft Corporation).

Figure 4:
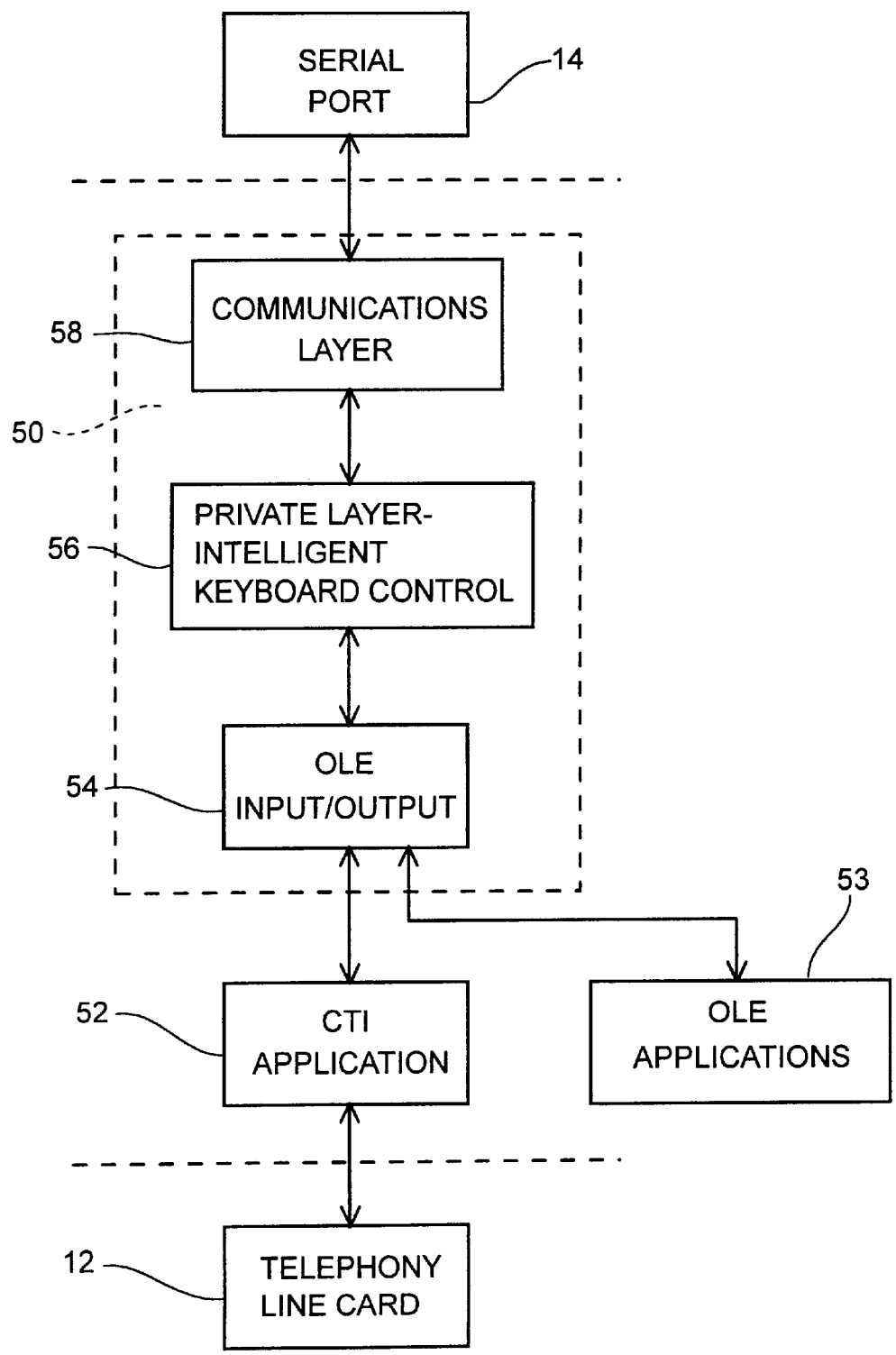
FIGS. 4 and 5 are block diagrams illustrating the preferred interrelation of software modules which operate a computer-telephony integrated user console formed in accordance with the present invention.

FIG. 4 is a simplified block diagram illustrating the relationship of the preferred functional software modules which collectively make up the control software of the present invention. Preferably, the control software will operate in an open architecture software platform which uses a standard messaging structure to support multiple applications. Exemplary software platforms include Windows®, JAVA(™) and the Unix® operating systems (Windows is a registered trademark of Microsoft Corporation, JAVA is a trademark of Sun Microsystems, Inc. and Unix is a registered trademark of Novell, Inc.). While the operation of the software will be described in the context of the Windows® platform, operation in other operating environments is contemplated as within the scope of the present invention.

In the Windows® operating system, multiple software applications can be operational simultaneously. In addition, these multiple applications can exchange information and even be embedded in one another through the use of object linking and embedding (OLE). OLE is a standard Windows® program protocol which facilitates the interoperability between various software applications. While not described in detail, it is anticipated that other software standard messaging protocols including the Active-X and OCX formats for Windows® and the Corba format for Unix®, could also be used to implement the present invention.

An overview of the functional modules of the software used to implement the CTI user console formed in accordance with the present invention will be described with reference to FIG. 4. The software includes an automation server module 50 and a computer-telephony integration (CTI) application software module 52. The CTI application software module 52 interfaces with the telephone line card 12 (FIG. 1). Preferably, the CTI application software module 52 complies with the OLE protocol and transfers information to and from the automation server module 50 using this protocol.

The OLE automation server module 50 preferably includes three virtual operating layers. The first layer is an OLE input/output layer 54. The OLE input/output layer 54 communicates with the CTI application module 52 and other OLE compatible applications 53 using the Windows® OLE standard. OLE compatible applications include word processors, data base programs, spreadsheets and the like. The OLE input/output layer 54 is thus considered a public layer of the automation server 50 in that other software applications 52, 53 can interact with this functional layer.

Directly interfaced with the OLE input/output layer 54 is the second layer of the automation server 50, which is a private layer 56. The private layer 56 receives commands from the OLE input/output layer 54 and forms appropriate commands for the intelligent integrated keyboard 8. The private layer 56 is dedicated to the control of the intelligent integrated keyboard 8 and can only be accessed by software applications running on the computer 2 through the OLE input/output layer 54.

The third layer is a communications layer 58 which controls communication between the intelligent integrated keyboard 8 and the automation server module 50. The communications layer 58 receives commands from the private layer 56 and formats these commands into a protocol which is compatible with the intelligent integrated keyboard 8. Once the commands are formatted into the appropriate protocol, the communications layer 58 interfaces with the hardware serial port 14 and ultimately to the intelligent integrated keyboard 8.

The communications layer 58 also receives data from the intelligent integrated keyboard 8 indicative of switch 26 closures. This data is transferred to the private layer 56. The private layer 56 determines which software application 52, 53 is currently assigned to the key being depressed and routes the switch press information through the OLE input/output layer 54 to the appropriate OLE software application 52, 53.

The intelligent integrated keyboard 8 provides an enhanced user interface for the CTI user console. This enhanced user interface is achieved by dynamically reconfiguring the functionality and the associated text and graphical icon displayed on the intelligent keys 24 in response to detected events. The events may take the form of signals from the telephone line 4, commands from the CTI application software 52 or commands from other OLE application software 53. The text and graphical icons can also be animated to further enhance the user interface. In addition, the intelligent integrated keyboard 8 may be partitioned into key groups, if necessary, with priorities established by the automation server module 50 among various software applications 52, 53 competing to invoke one or more intelligent key 24 of the integrated intelligent keyboard 8.

Figure 5:
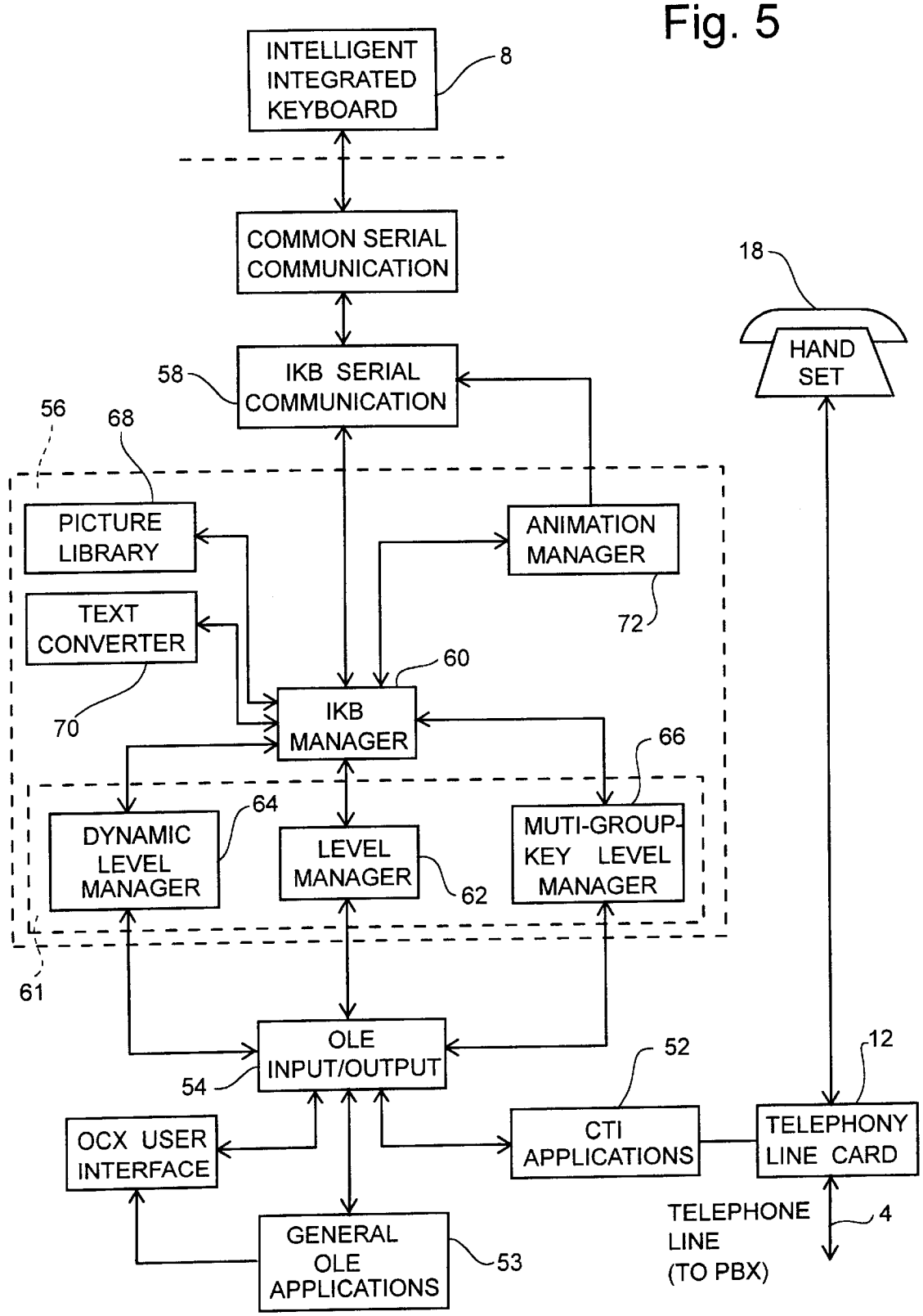

FIG. 5 further illustrates the preferred operating modules which form the private layer 56 of the automation server module 50. The main operating module of the private layer 56 is the intelligent keyboard (IKB) manager 60. The IKB manager 60 receives event information from the OLE input/output layer 54 and manipulates this information to control the intelligent integrated keyboard 8. The IKB manger 60 also receives switch 26 closure data from the intelligent integrated keyboard 8 and routes the data to the appropriate software application 52, 53.

As previously stated, the intelligent keys 24 of the intelligent keyboard 8 can be reassigned in total, in groups of keys or individually. Key reassignments are typically event driven. Events may be detected from several sources, such as the telephone line card 12, the CTI application software 52, or other software application 53. Typically, these reassignments can be characterized as progressive command layers, i.e., the current key assignments predictably resulting from the previous assignment and a detected event. To facilitate the management of the various levels of intelligent key 24 functionality and display, the private layer 56 employs a level manager software module 61 operating between the IKB manager 60 and the OLE input/output layer 54.

Preferably, the level manager software module 61 includes a primary level manager 62, a dynamic level manager 64 and a multi-group-key level manager 66. Operating through the OLE input/output layer 52, the level manager software module 61 receives requests for intelligent key 24 assignments from the CTI application software 52 and various other application software packages 53. These requests are routed to the IKB manager 60 which determines if these requests can be serviced. The IKB manager 60 prioritizes conflicting requests for the intelligent keys 24 and makes the assignments according to either a dynamic or a predetermined priority hierarchy.

As previously discussed in connection with FIG. 3, each intelligent key 24 includes a bit mapped liquid crystal display (LCD) 28. To display graphics and text on the LCD 28, these symbols must first be converted to digital pixel-based bit maps which activate or deactivate the individual pixels on the LCD 28. To facilitate this conversion, the IKB manager 60 employs a picture library module 68 and a text converter module 70.

The picture library module 68 includes a digital storage table which contains a plurality of preestablished bit mapped graphical icons which can be selected by the IKB manager 60 at the request of an OLE application 52, 53. These bit mapped graphical icons are passed by the IKB manager 60 to the IKB serial communications layer 58 and ultimately to the intelligent key processor 30 for display on the LCD 28. In addition, the picture library module 68 can also receive a location from an OLE application 52, 53 indicating where a graphical icon is remotely stored. Using this location information, i.e. disk directory and file name, the picture library module 68 can import the desired graphical icon and add this icon to the storage table. The text converter 70 receives (ASCII) text characters from the IKB manager 60 and converts each character into a bit mapped graphic suitable for display on an LCD 28.

To further enhance the user interface provided by the intelligent integrated keyboard 8, the private layer 56 further includes an animation manager 72. In response to a request from the CTI application module 52 or other OLE software application 53, the IKB manager 60 transfers a plurality of related bit mapped graphics from the picture library 68 to the animation manager 72. These related bit mapped graphics are selected such that when presented sequentially, an animated sequence will be displayed on at least one of the intelligent keys 24.

Once the animation manager 72 receives the sequence of graphics from the IKB manager 60, the animation manager 72 operates directly with the IKB serial communications layer 58 to generate the desired animation sequence. The use of the animation manager 72 removes the burden of animation from the IKB manager 60 and allows the IKB manager 60 to perform the core keyboard control functions.

The interaction between the CTI applications software 52 and the integrated intelligent keyboard 8 will now be further described in connection with a series of illustrations in FIGS. 6–10. FIGS. 6–10 sequentially illustrate an exemplary series of events and responses typical of the present invention.

Figure 6A:
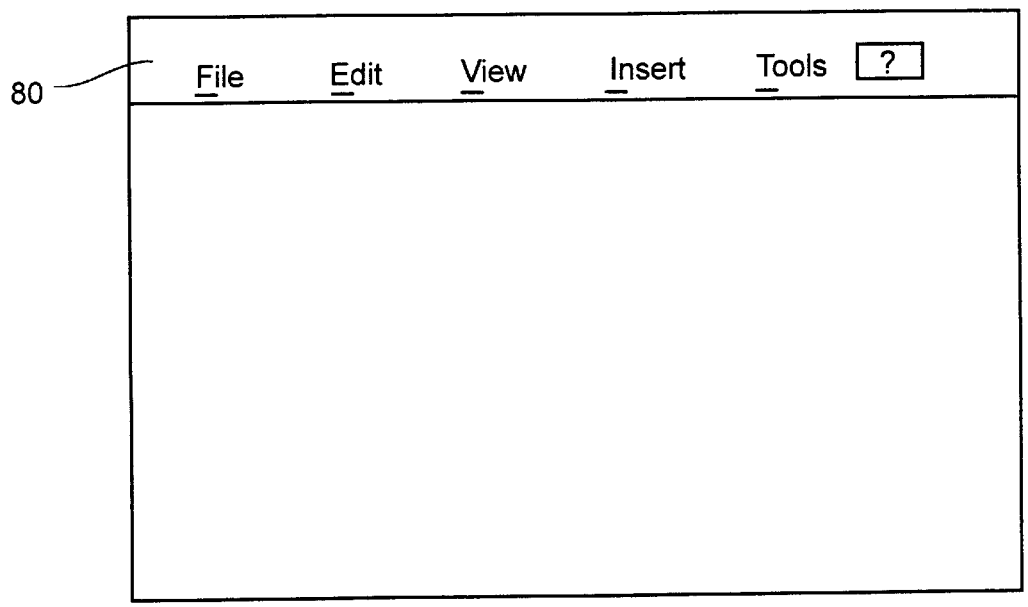
FIGS. 6A and 6B are pictorial diagrams of an exemplary computer CRT display and corresponding intelligent integrated keyboard system display, respectively, illustrating the cooperative operation between the intelligent keyboard system and computer during operation of a computer-telephony integrated user console formed in accordance with the present invention.
Figure 6B:
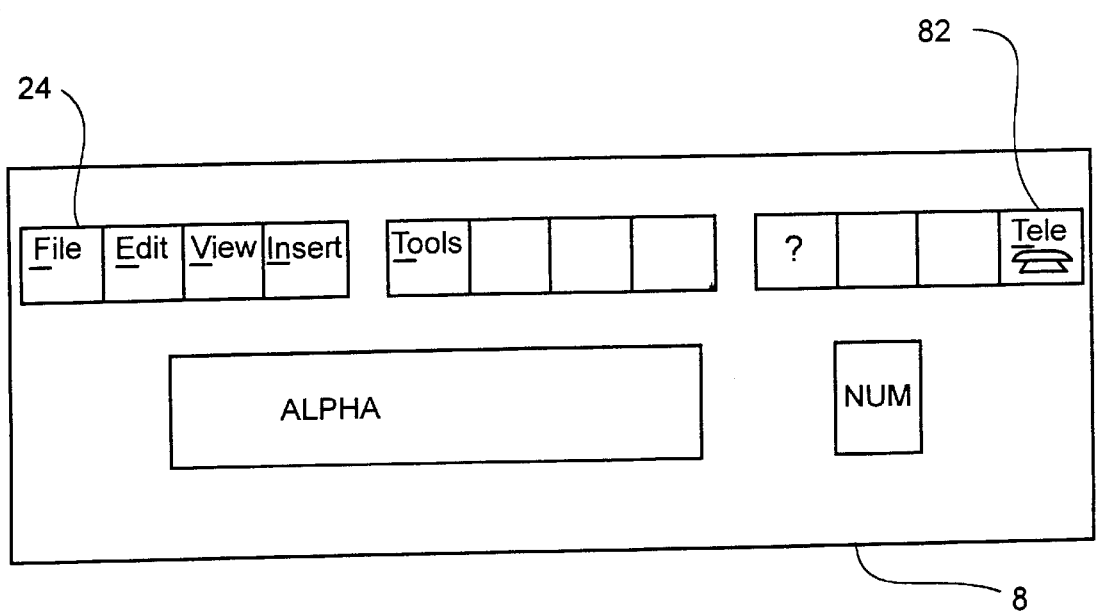

FIG. 6A is a pictorial diagram illustrating an exemplary CRT 17 display of a Windows® based software program having a toolbar 80 with a number of function commands displayed. FIG. 6B is an illustration of the intelligent integrated keyboard 8 with several of the intelligent keys 24 displaying the same commands which are displayed on the toolbar 80 of the CRT 17 display. In addition, one intelligent key 82 is illustrated with a telephone graphic icon displayed along with illustrative descriptive text, TELE.

As is conventional with Windows® software, the various functions of the application software can be selected by directing a digital pointer, i.e., a mouse, to one of the commands on the toolbar and depressing a button to select that function menu. Alternatively, with the use of the integrated intelligent keyboard 8 of the present invention, each function menu may be selected simply by depressing the appropriate intelligent key 24 displaying the desired function. This allows the user of the CTI user console to quickly select a desired function with only minimal hand movement and required dexterity. This cooperative relationship between the CRT 17 and the intelligent keyboard 8 is achieved through the interaction between the application software 53 and the automation server 50 formed in accordance with the present invention.

In response to an intelligent key 24 being depressed, a signal is sent from the intelligent keyboard 8 to the computer 2 indicative of this event. This signal, in the form of serial data, is received through the serial port 14 and is routed to the IKB serial communications layer 58.

The IKB serial communications layer 58 routes the key press information to the IKB manager 60 which correlates the detected event to an assigned software application. Working through the OLE input/output layer 54, the IKB manager 60 interfaces with the OLE applications 52, 53 which is assigned to the currently pressed key 26. Preferably, the OLE application 52, 53 responds to this event in a manner consistent with the same function being selected by the digital pointer.

Figure 7A:
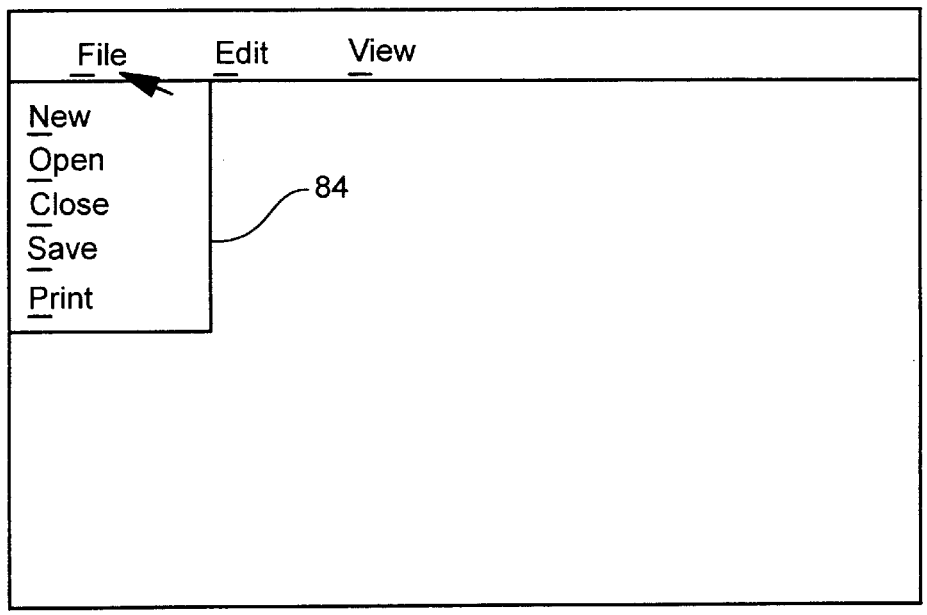
FIGS. 7A and 7B are pictorial diagrams of a computer CRT display and corresponding intelligent keyboard display, respectively, further illustrating the cooperative relationship between the intelligent keyboard and computer system of a computer-telephony integrated user console formed in accordance with the present invention.
Figure 7B:
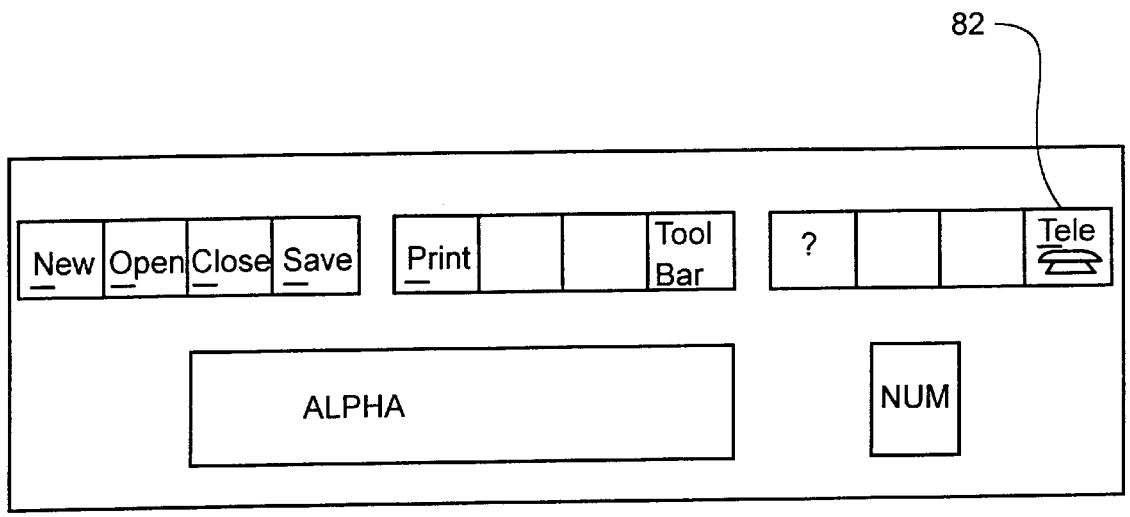

FIG. 7A illustrates a typical pull down menu which results when a "File" command is selected. This command can be selected from the exemplary Windows® application software toolbar or by depressing the intelligent key 24 displaying the "File" icon or text on the intelligent keyboard 8. Once this function is selected, a new series of commands is made available in a pull down menu 84 by the application software 53. FIG. 7B illustrates that the IKB manager 60 has reassigned several of the intelligent keys 24 such that the new commands are available on the integrated intelligent keyboard 8. These commands may be selected simply by depressing the intelligent key 24 displaying the appropriate command.

It should be noted that key 82, displaying the telephone icon, has not changed functions. In this case, the multi-group-key level manager 66 has requested an assignment of this key to the CTI application module 52 which is running in the background. The IKB manager 60 has given this function priority over the general applications software 53 currently running in the foreground. Preferably, the CTI application module 52 can be immediately invoked by depressing this key 82.

Figure 8A:
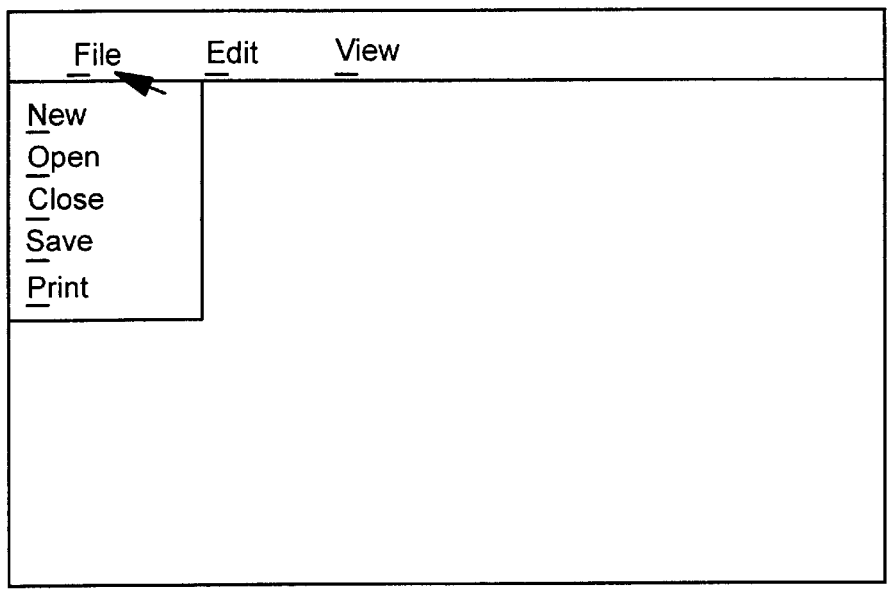
FIGS. 8A and 8B are pictorial diagrams of a computer CRT display and corresponding intelligent keyboard display, respectively, further illustrating the cooperative relationship between a computer system and intelligent keyboard of a computer-telephony integrated user console formed in accordance with the present invention.
Figure 8B:
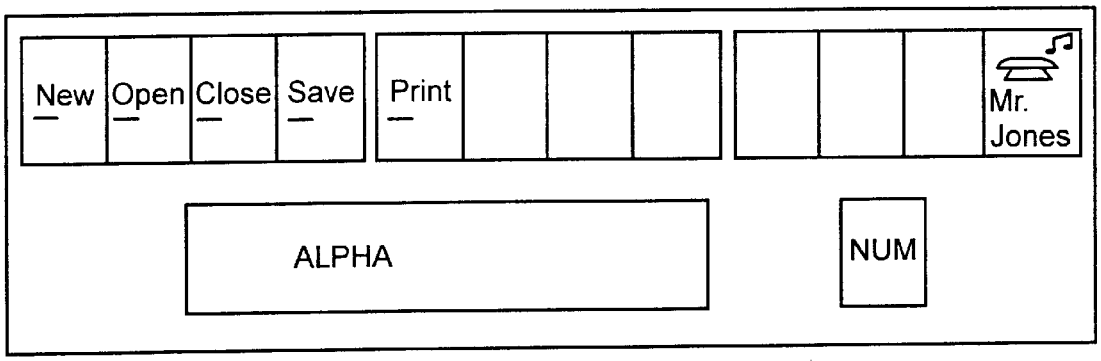

FIGS. 8A and 8B illustrate a similar state of the keyboard 8 and CRT 17 display as in FIGS. 7A and 7B respectively. However, in FIGS. 8A and 8B the CTI application module 52 has detected an incoming call from the telephone line card 12. In response to the detected incoming call, the CTI application module 52 interrupts the IKB manager 60 and requests a change in both the function and display in the telephone key 82.

Figure 8C:
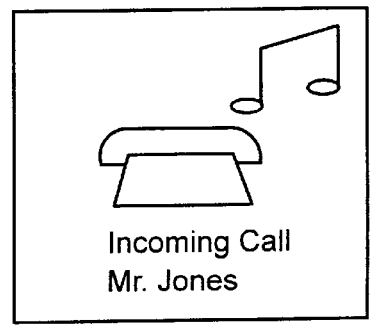
FIG. 8C is a pictorial diagram further illustrating an exemplary display of both text and a graphical icon on one key of an intelligent keyboard, formed and operating in accordance with the present invention.

FIG. 8C is an enlarged illustration showing an exemplary icon and text associated with the detection of an incoming call. The CTI application 52 can further instruct the IKB manager 60 to animate this icon and change the color of this key in response to the incoming call. For example, the key 82 can change from green to red and musical notes can alternatively be displayed and removed to correspond to the ringing of the phone. Preferably, the CTI application 52 can determine the identity of the caller from the telephone line card 12 and display the ID information on the key as well.

In response to a signal that key 82 has been depressed, the CTI application software 52 directs the telephone line card 12 to couple the handset 6 to the telephone line 4, thus answering the call. In addition, a CTI application menu is enabled on the intelligent integrated keyboard 8. FIG. 9B illustrates exemplary key assignments established by the CTI application module 52 in response to the incoming call being answered. Typical key assignments may include: the status of a second telephone line 86 (requiring an additional line card 12 and telephone line 4), a function key to place the active call on hold 88, a function key to transfer the active call to another number 90, a function key to transfer the active call to voice mail 92, a function key to hang up the active call 94 and the like. In addition, a function key can be assigned on the intelligent keyboard 8 to activate additional software applications, such as a customer service menu 96.

In response to each of these function keys being depressed, a further layer of key functions will then be displayed. Further, each of the keys may include animation to further enhance the user interface. For example, if the caller was placed on hold by depressing the hold function key 88, that key 88 could change color and an animated timer could be added as a graphic under the control of the animation manager 72 as a reminder to the user.

Figure 9A:
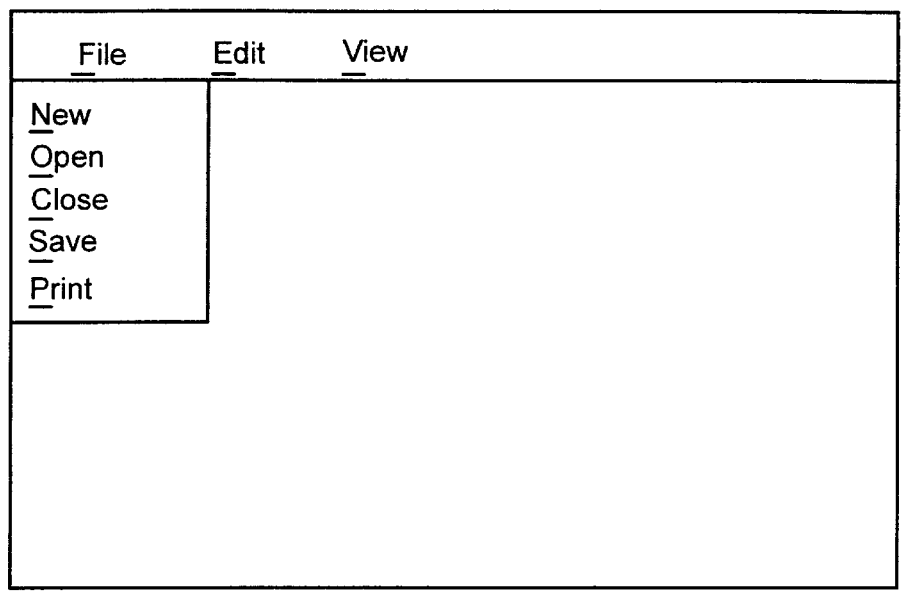
FIGS. 9A and 9B are pictorial diagrams of a computer CRT display and corresponding intelligent keyboard display, respectively, illustrating the operation of an intelligent keyboard in a computer-telephony integrated user console in response to a telephone call being answered, in accordance with the present invention.
Figure 9B:
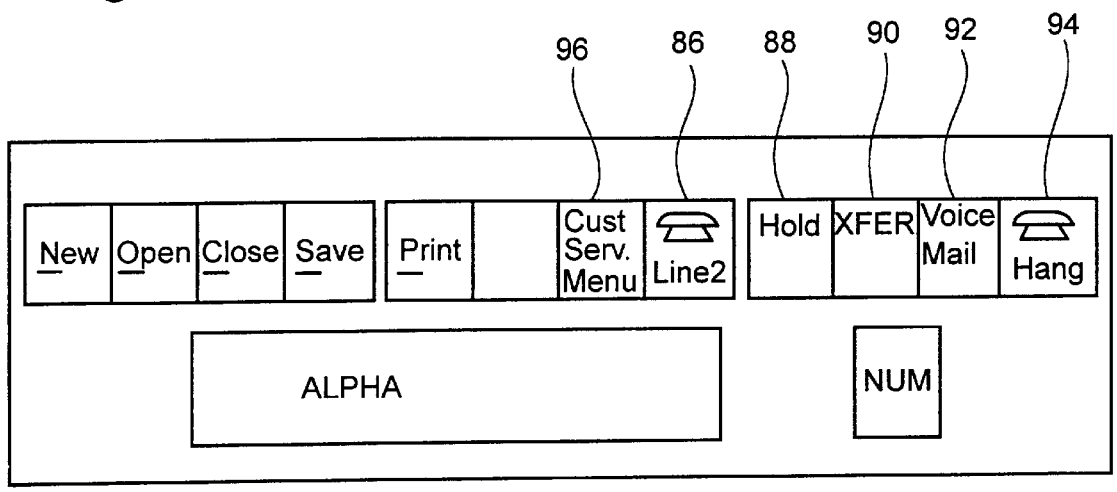

In the illustrations of FIGS. 9A and 9B, the application software 53 which was operating at the time the incoming call arrival is still available in the active window of the computer screen and the functionality of the intelligent keys 24 previously assigned to this program are still available. In this example, no conflict between the CTI applications module 52 and the application software 53 occurred in their respective intelligent key 24 assignments. If multiple applications were competing for one or more keys, the IKB manager 60 would make appropriate key assignments based on a priority hierarchy. These assignments would be passed to the applications 52, 53 through the level managers 62, 64, 66 and OLE input/output layer 54.

Figure 10A:
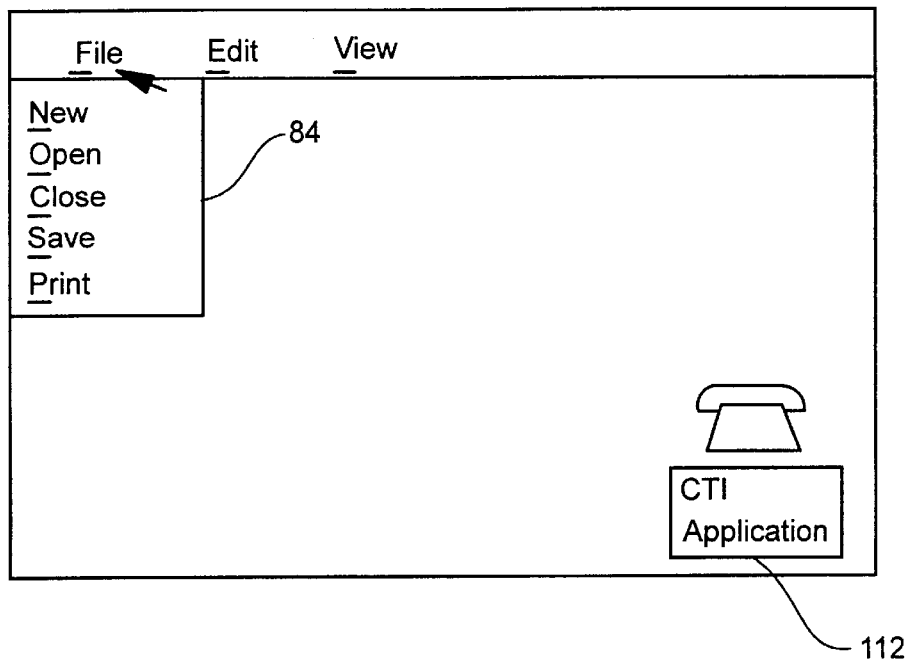
FIGS. 10A and 10B are pictorial diagrams of a computer CRT display and corresponding intelligent keyboard display, respectively, illustrating the operation of an intelligent keyboard in a computer-telephony integrated user console in response to a telephone call being originated by a user, in accordance with the present invention.
Figure 10B:
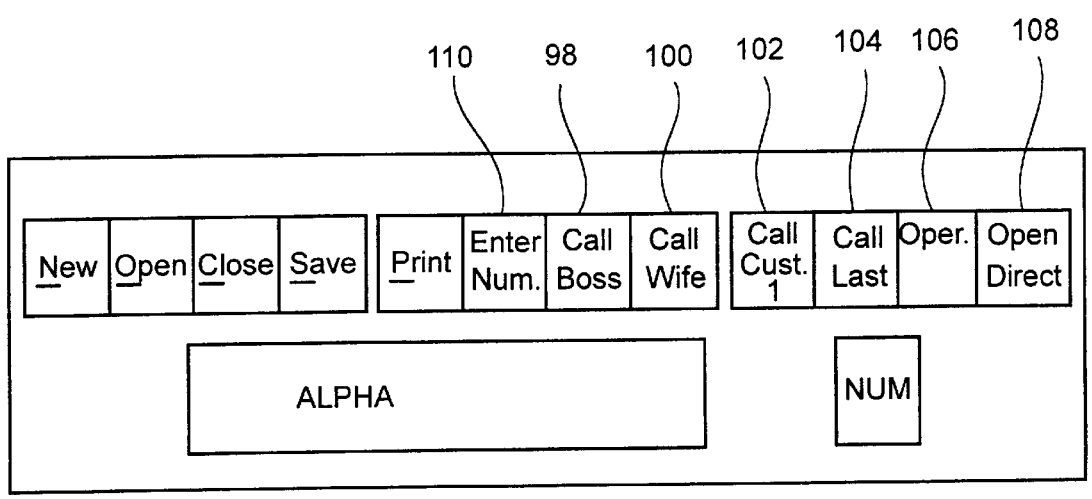

In addition to receiving a call, a user can initiate an outgoing call by depressing key 82 to activate an outgoing call menu of the CTI application module 52. FIGS. 10A and 10B illustrate exemplary displays on both the CRT 17 display and intelligent integrated keyboard 8 in response to key 82 being depressed in the absence of an incoming call. Exemplary functions assigned to the intelligent integrated keyboard 8 in response to the CTI application module 52 include: dialing preassigned numbers 98, 100, 102, calling the last number previously dialed 104, requesting the operator 106, opening a computer-based telephone directory, manually entering a number 110 on the standard keyboard 20 and the like. In addition, the CTI application software module 52 preferably brings a minimized icon to the foreground of the CRT 17 display to facilitate access to this application by use of a digital pointer. It shall be noted that this functionality has been activated without interrupting the function of the other active software application 53 operating in the foreground.

When an intelligent key 24 with a preassigned telephone number is activated by the user, the automation server 50 will direct the CTI application module 52 to initiate an outgoing call. In response, The CTI application module 52 directs the telephone line card 12 to seize the telephone line 4 and dial the number which is assigned to the selected key. The CTI application module 52 further directs the telephone line card 12 to connect the handset 6 to the telephone line 4. Preferably, the CTI application module 52 directs the automation server 50 to assign appropriate functions and displays to one or more intelligent keys 24. Such functions include hanging up the call and transferring the call to another user console.

It is to be appreciated that the number of key function layers illustrated, and the specific functions associated with the individual keys in the previous examples are merely exemplary. The intelligent integrated keyboard 8 of the present invention is capable of fully programmable operation with a large number of possible variations. The levels of functionality for the intelligent integrated keyboard 8 are a function of the software complexity of the private layer 56 and the hardware capabilities of the host computer 2.

Through the use of an intelligent keyboard operating under the control of software formed in accordance with the present invention, an improved computer-telephony integrated (CTI) user console is formed. The improved CTI user console provides an enhanced user interface to both a telephone system and data processing system without requiring the use of a digital pointer, such as a mouse. This enhanced user interface provides for commands to be easily entered by a user without removing his or her hands from a main computer keyboard. Further, through the use of a standard software interface, such as OLE, the enhanced user interface can control standard applications software such as wordprocessors, database programs, spreadsheet programs and the like.

A computer program of the operation of the computer-telephony user console in accordance with the present invention is provided herewith and is incorporated herein as part of the disclosure of the invention.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A computer-telephony integrated user console for manipulating calls in a telephone system and manipulating data in a data processing system, the user console comprising:
   a computer system, the computer system including the data processing system therein;
   a telephone line interface, the telephone line interface being electrically interposed between the computer system and the telephone system; and
   a keyboard electrically coupled to the computer system, the keyboard including at least one programmable display key, the at least one programmable display key including a switch electrically coupled to the computer system for providing input thereto and a programmable electrical display, the programmable electrical display providing a visual indication of at least one of text and graphics in response to signals received from the computer system;
   computer software including a software automation server module at least partially operatively controlling the computer system, the automation server module having an architecture comprising:
      a software input/output layer, the software input/output layer providing a standard interface between at least one software application and the software automation server module;
      a keyboard communications layer, the keyboard communications layer controlling digital communications between the computer system and the keyboard; and
      a keyboard control layer, the keyboard control layer being a private layer and interposed between the software input/output layer and the keyboard communications layer, the keyboard control layer being responsive to commands received from the at least one software application and generating keyboard control commands for the at least one display key, the keyboard control layer being further responsive to activation of the at least one switch and generating keyboard event commands in response thereto, the keyboard event commands being presented to the at least one software application through the software input/output layer.

2. A computer-telephony integrated user console as defined by claim 1, wherein the at least one software application includes a computer-telephony integration applications module, the computer-telephony integration applications module controlling commands and communication between the telephone line interface and the computer system.

3. A computer-telephony integrated user console as defined by claim 2, wherein the computer system is operating a Windows® software platform and wherein the standard interface of the software input/output layer is Object Linking and Embedding compliant.

4. A computer-telephony integrated user console as defined by claim 3, wherein the at least one programmable display key includes twelve (12) programmable display keys.

5. A computer-telephony integrated user console as defined by claim 4, wherein the keyboard control layer establishes assignments for the programmable display keys among the at least one software application.

6. A computer-telephony integrated user console as defined by claim 5, wherein each programmable electrical display of the programmable display keys comprises a liquid crystal display.

7. A computer-telephony integrated user console as defined by claim 6, wherein the keyboard further includes a QWERTY alphanumeric keypad.

8. A method of operating a user console, which manipulates data in a device or system and manipulates data in a data processing system, the console including a keyboard with at least a first display key and at least a second display key, each of the at least first display key and the at least second display key including a switch and a display element and being configured to be assigned a function and a display, the method comprising the steps:
   a) assigning the at least first display key to a first software application;
   b) assigning a first function and a first display to the at least first display key assigned to the first software application;
   c) assigning the at least second display key not assigned to the first software application to at least a second software application;
   d) assigning a second function and a second display to the at least second display key assigned to the at least second software application;
   e) detecting an event and correlating the event to one of the first software application and the at least second software application; and f) reassigning the function and display of at least one of the at least first display key and the at least second display key assigned to the software application correlated to the detected event.

9. An integrated user console for manipulating data in a first device or system and manipulating data in a second data processing system, the user console comprising:

a computer system, the computer system including the data processing system therein;

an interface circuit, the interface circuit being electrically interposed between the computer system and the first device or system; and a keyboard electrically coupled to the computer system, the keyboard including at least one programmable display key, the at least one programmable display key including a switch electrically coupled to the computer system for providing input thereto and a programmable electrical display, the programmable electrical display providing a visual indication of at least one of text and graphics in response to signals received from the computer system;

computer software including a software automation server module at least partially operatively controlling the computer system, the automation server module having an architecture comprising:

a software input/output layer, the software input/output layer providing a standard interface between at least one software application and the software automation server module;

a keyboard communications layer, the keyboard communications layer controlling digital communications between the computer system and the keyboard; and a keyboard control layer, the keyboard control layer being a private layer and interposed between the software input/output layer and the keyboard communications layer, the keyboard control layer being responsive to commands received from the at least one software application and generating keyboard control commands for the at least one display key, the keyboard control layer being further responsive to activation of the at least one switch and generating keyboard event commands in response thereto, the keyboard event commands being presented to the at least one software application through the software input/output layer.

10. An integrated user console as defined by claim 9, wherein the at least one software application includes a computer integration applications module, the computer integration applications module controlling commands and communication between the interface circuit and the computer system.

11. An integrated user console as defined by claim 10, wherein the computer system is operating a Windows® software platform and wherein the standard interface of the software input/output layer is Object Linking and Embedding compliant.

12. An integrated user console as defined by claim 11, wherein the at least one programmable display key includes twelve (12) programmable display keys.

13. An integrated user console as defined by claim 12, wherein the keyboard control layer establishes assignments for the programmable display keys among the at least one software application.

14. An integrated user console as defined by claim 13, wherein each programmable electrical display of the programmable display keys comprises a liquid crystal display.

15. An integrated user console as defined by claim 14, wherein the keyboard further includes a QWERTY alphanumeric keypad.

* * * * *